W. C. FICKES.
RESILIENT WHEEL.
APPLICATION FILED OCT. 21, 1911.
1,047,190.
Patented Dec. 17, 1912.
2 SHEETS—SHEET 1.
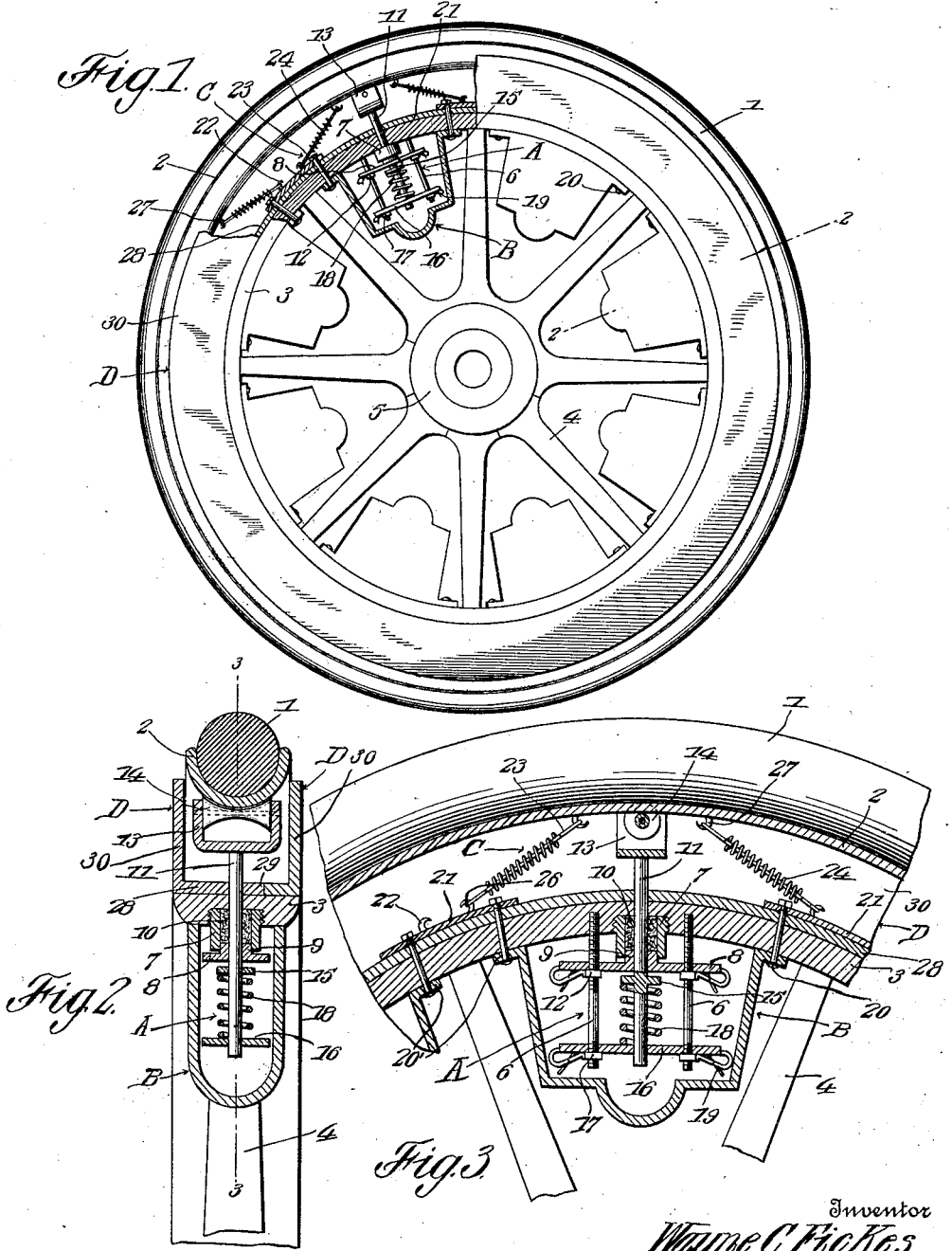

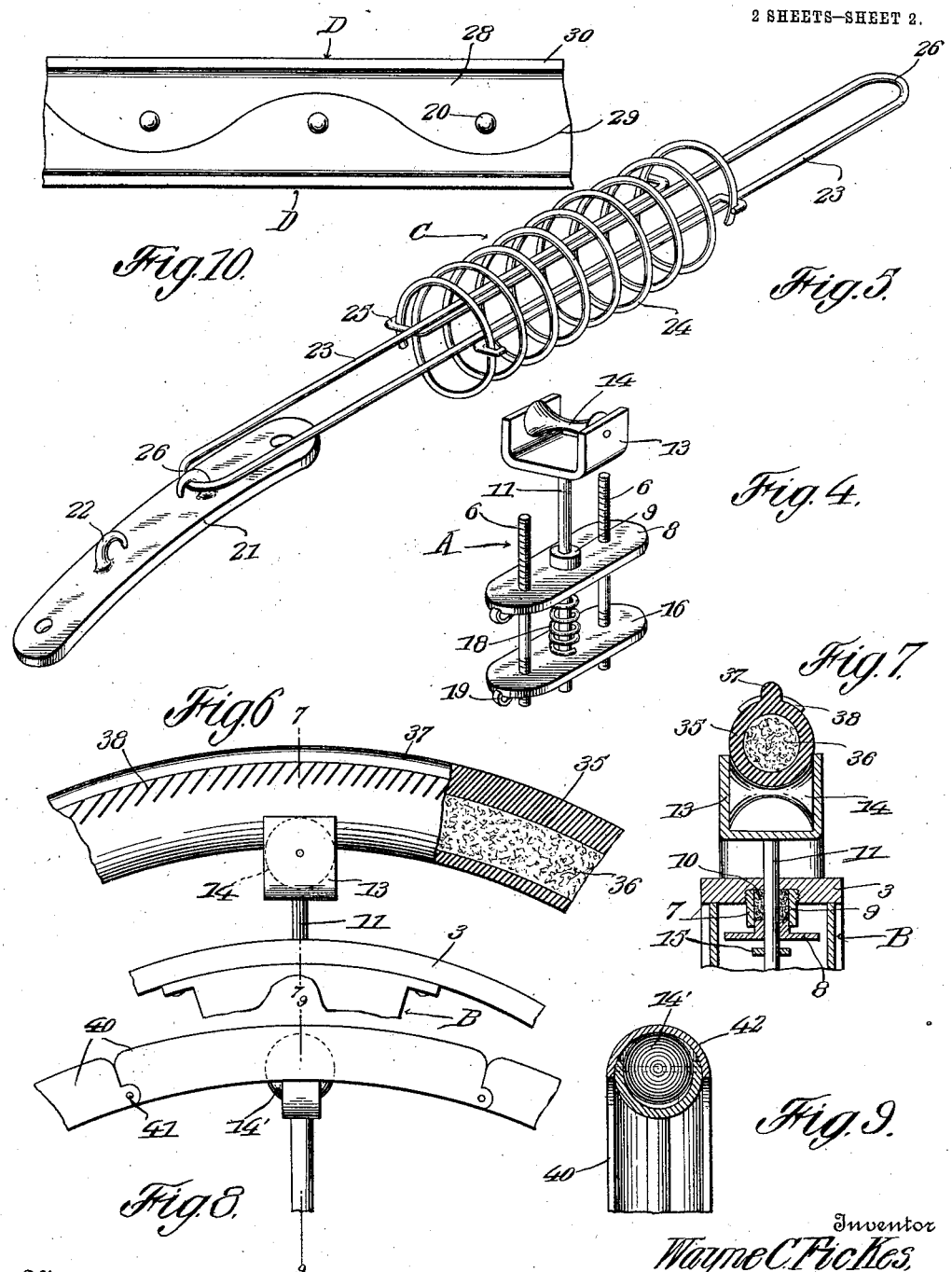

UNITED STATES PATENT OFFICE.

WAYNE C. FICKES, OF SHIRLAND, ILLINOIS.

RESILIENT WHEEL.

1,047,190.   Specification of Letters Patent.   Patented Dec. 17, 1912.

Application filed October 21, 1911. Serial No. 656,075.

*To all whom it may concern:*

Be it known that I, WAYNE C. FICKES, a citizen of the United States, residing at Shirland, in the county of Winnebago and State of Illinois, have invented new and useful Improvements in Resilient Wheels, of which the following is a specification.

This invention relates to resilient wheels for automobiles and other motor vehicles, and it has for its object to produce a wheel of simple and improved construction which shall be capable of yielding freely to the weight supported thereon so as to ride smoothly over rough roads.

A further object of the invention is to produce a wheel of the character described which may be readily assembled or disassembled so as to afford access to the interior in case of necessity for the purpose of cleaning, oiling or repairing the parts.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation of a wheel constructed in accordance with the invention, parts being broken away for the purpose of exposing the interior construction. Fig. 2 is a transverse sectional view taken on the line 2—2 in Fig. 1. Fig. 3 is a vertical sectional view taken on the line 3—3 in Fig. 2. Fig. 4 is a perspective detail view, enlarged of a portion of the wheel showing one of the radial spring units and related parts. Fig. 5 is a perspective detail view showing one of the tangential spring units and related parts. Fig. 6 is a detail side view partly in section showing a slightly modified construction. Fig. 7 is a sectional detail view taken on the line 7—7 in Fig. 6. Fig. 8 is a sectional detail view illustrating another modification. Fig. 9 is a sectional detail view taken on the line 9—9 in Fig. 8. Fig. 10 is a detail plan view showing a portion of the inner circumference of the casing members D.

Corresponding parts in the several figures are denoted by like characters of reference.

In the preferred form of the invention, 1 designates a solid rubber tire which is permanently seated and suitably secured in a concave metallic rim 2 of U-shaped cross section. This rim will be designated as the outer rim to distinguish it from the inner metallic rim 3, the latter being a flat metallic rim which is connected by the radial spokes 4 with the hub 5 which may be of any preferred construction. Any desired number of spokes may be used, although it is not desirable that they should be placed too closely together in order to afford sufficient room for the working parts to be hereinafter described. For purposes of illustration an eight-spoke wheel has been shown, but a wheel having a greater number of spokes may be used if desired.

The inner rim is equipped with a number of spring units A which for convenience may be called the radial spring units, one such unit being arranged between each pair of spokes. Each unit is composed of two rods or side members 6, threaded at both ends and screwed into the rim 3 between and equidistantly from proximate spokes 4. The rim 3 is provided on its inner face intermediate and equidistantly from each pair of proximate spokes with an inwardly extending packing box 7, adjacent to which the rods or side members 6 are arranged in parallel relation. The rods 6 support a plate 8 having a flange or follower 9 that engages the packing box 7 to compress the packing 10 in said box about a rod 11 which is slidable therethrough and through the plate 8. The latter may be moved in the direction of the packing box 7 by means of nuts 12 threaded upon the rods 6. The rod 11 of each unit carries at its outer end a yoke 13 in which an annularly grooved pulley or anti-friction member 14 is journaled for the purpose of engaging and supporting the rim 2 carrying the tire 1. Each of the rods 11 is provided with an annular flange or collar 15, and the rods of side members 6 are connected adjacent to their inner ends by means of a cross piece 16 which is retained in position by means of nuts 17. Between the cross piece 16 and the collar 15 a spring 18 is placed upon the rod 11, the tension of which spring may be regulated by tightening or loosening the nuts 17. The plates or cross pieces 9 and 16 are each provided with nut locking devices 19 of any convenient and approved construction to prevent the nuts 12 and 17 from working loose by vibration when the device is in operation.

It is obvious that by proper adjustment of the nuts 17 the tension of the respective springs 18 may be regulated so that the outer rim 2 carrying the tire 1 will be disposed concentrically with the inner rim 3 having the spring projected rods 11 which support the outer carrying tire rim. The packing in the boxes 7 may be saturated with lubricating material to enable the parts to work freely.

To protect those portions of the spring units A which project inwardly from the rim 3 a cap B is provided for each unit, said caps being mounted upon the inner face of the rim 3 by means of screws or bolts 20 extending through the flanges 20' of said cap and through the rim 3. These screws or bolts 20 also serve to secure exteriorly upon the rim 3 the plates 21 one of which is disposed adjacent to the outer end of each spoke. Each plate 21 is provided with two opposed hooks 22 for the attachment of the inner ends of the tangential spring units C. Each of said tangential spring units is composed of two narrow elongated U-shaped yokes 23 extending in opposite directions through a coiled spring 24, the limbs or side members of each yoke being provided with terminal hooks 25 engaging the end coils of the spring. The bridge members 26 at the ends of the respective yokes 23 constitute attaching means whereby the inner end of each spring unit C is engaged, respectively, with one of the hook members 22 and with an attaching member, such as a hook 27 upon the inner face of the outer rim 2. The attaching members 27 may be secured upon the rim 2 in any suitable manner and in such relation to the hook members 22 as to secure the most satisfactory results.

It is obvious that when a vehicle equipped with wheels constructed in accordance with my invention is in motion, the springs associated with the units A lying below the horizontal diameter will be placed under compression strain, while the springs of the units C disposed above the horizontal diameter will be placed under tensile strain, and that the spring units disposed about the circumference of the wheel will be successively placed under tension as the wheel revolves. The spring units C will thus tend to exert a lifting action upon the rim 3 and the inner portion of the wheel whereby the inner and outer portions of the wheel are maintained in equilibrium. That is to say, as each spring unit A is being compressed and the roller or anti-friction member carried by such spring unit tends to bind against the inner face of the outer rim, this binding action is counteracted by the spring units C which resiliently connect the inner and outer rims of the wheel and cause said rims to rotate in unison and with no danger or possibility of binding or of becoming choked with reference to each other. The action greatly resembles that of a pneumatic tire, and it will be found that the motion of the vehicle will be smooth and easy.

For the purpose of protecting the spring units A the oil and dust proof caps B have been provided. In order to protect the spring units C lying between the inner and outer rims I have provided a casing which is composed of two side members D, D which shall be secured in position by means of the screws or bolts 20 serving to attach the caps B and the hook plates 21 to the inner rim 3 in such a manner that either side member D may be removed to afford access to the interior of the casing for inspection or repairs.

The side members D of the casing each consist of an annular plate 28, said plates having scalloped or zig-zag meeting edges 29, and said plates being each provided at its outer edge with an annular flange 30, said flanges 30 being of such dimensions as to normally extend about midway of the tire 1 so as to permit said tire and the rim 2 to operate freely between said flanges. The plates 28 are provided with apertures for the passage of the bolts 20, said plates being seated upon the outer face of the inner rim 3 between the latter and the plates 21, which will thus practically be disposed within the casing. The plates 28 are notched at proper intervals for the passage of the rods 11. It will be seen that each casing member will be secured by a plurality of bolts, each of which is associated with one end of one of the caps B. It follows that either one of the casing members may be detached without disassembling the remaining parts of the wheel.

In place of the solid rubber tire shown in Figs. 1 to 5, inclusive, it may be found desirable to use a tubular metallic tire, such as shown at 35 in Fig. 6, said tubular tire being preferably filled with sound-deadening material such as ground cork or the like, as shown at 36, which may be introduced in any convenient manner. The tubular metallic tire is provided with an external annular rib or flange 37 to prevent skidding, and said tire is also preferably corrugated or grooved, as shown at 38, to grip the surface of the road. When the tubular metallic tire 35 is used, it is obvious that the rim 2 may be dispensed with, said tire being directly engaged by the anti-friction members 14, and said tire also serving for the direct attachment of the fastening members 27.

Under the further modification of the invention shown in Figs. 8 and 9 there is substituted for the tire 1 and rim 2 an annular casing composed of a plurality of trough-shaped sections 40 hingedly connected together, as shown at 41, said sections being composed of metal which may be used in connection with an exterior covering 42 of rubber, leather or the like. Under this construction the anti-friction elements here designated by 14' are made of spherical shape or of other suitable cross sectional shape which will enable them to operate interiorly of the trough-shaped sections 40. In other respects the construction is similar to that hereinbefore described.

From the foregoing description taken in connection with the drawings hereto annexed, it will be seen that I have provided a resilient wheel of simple and efficient construction and one which is less liable to injury than the pneumatic wheel now ordinarily employed.

Having thus described the invention, what is claimed as new, is:—

1. In a wheel, an outer rim, an inner rim, said inner rim being provided with a hub and spokes, and spring units associated with the inner rim, each unit including two parallel side members connected with the rim and extending inwardly therefrom, cross pieces adjustably associated with said side members, a rod guided through the cross pieces and through the rim and having at its outer end an anti-friction member engaging the outer rim, said rod being also provided intermediate the cross pieces with a collar, and a spring coiled about said rod between the collar and the cross piece distant from the rim, in combination with spring units resiliently connecting the inner rim with the outer rim of the wheel.

2. In a wheel, an outer rim, an inner rim having a hub and spokes, said inner rim being provided with packing boxes arranged upon the inner face thereof intermediate the spokes, and spring units associated with said inner rim, each of said spring units comprising two side members connected with the rim and disposed in parallel relation at opposite sides of the packing box, said side members having terminally threaded ends, a cross piece engaging the side members and having a follower operating in the packing box, nuts to force said cross piece in the direction of the packing box, a second cross piece adjustable upon the side members, nuts engaging said second cross piece to force it in the direction of the rim, a rod extending through the rim, the packing box and the cross pieces, said rod having an anti-friction element engaging the outer rim and an annular flange disposed between the cross pieces, and a spring surrounding said rod and disposed between the flange on said rod and the second cross piece.

3. In a wheel, an outer rim, an inner rim having packing boxes, rods extending through said packing boxes in radial relation to the two rims, springs to project said rods in the direction of the outer rim, adjustably supported plates through which the rods are guided, said plates having annular flanges constituting followers that operate in the packing boxes, and anti-friction members carried by the rods to engage the outer rim.

4. A wheel including an outer rim, an inner rim having a hub and spokes, radial spring units associated with the inner rim and including spring projected rods having anti-friction members engaging the outer rim, tangential spring units resiliently connecting the outer rim with the inner rim, plates mounted on the inner rim and having opposed hooks for the attachment of the inner ends of the tangential spring units, fastening members connecting the two ends of the hook plates with the inner rim, and a casing comprising two members, one of said members being secured on the wheel by the fastening members at one end of each hook plate, and the other casing member being secured by the fastening members at the other end of each hook plate, whereby either member of the casing may be detached without disturbing the other member or the hook plates.

5. A spring wheel including an outer rim, an inner rim, radial spring units associated with the inner rim and including spring projected rods having anti-friction members engaging the outer rim, tangential spring units resiliently connecting the inner rim with the outer rim, plates mounted on the inner rim and having opposed hooks for the attachment of the inner ends of the tangential spring units, protective caps for the radial spring units having flanges engaging the inner rim, fastening members connecting the two ends of the hook plates with the inner rim, and a casing comprising two members, one of said members being secured on the wheel by the fastening members at one end of each hook plate, and the other casing member being secured by the fastening at the other end of each hook plate, whereby either member of the casing may be detached without disturbing the other member of the casing, the hook plates or the protective caps.

6. A spring wheel including an outer rim, an inner rim, radial spring units associated with the inner rim and including spring projected rods having anti-friction members engaging the outer rim, plates disposed exteriorly of the inner rim intermediate the radial spring units and having opposed hooks, protective caps for the radial spring units having flanges abutting interiorly upon the inner rim, a casing comprising two similar members having portions exteriorly engaging the inner rim, supporting the hook plates and having scalloped meeting edges, said casing portions having outwardly extending flanges lying adjacent to the sides of the outer rim, tangential spring units connecting the outer rim with the hook plates, and fastening members at the two ends of the hook plates, said fastening members extending through the casing members, the inner rim and the flanges of the protective caps and connecting said parts together; the fastening member at one end of each hook member being engaged with the scalloped portion of one casing member, and the fastening member at the opposite end of each hook plate being engaged with the scalloped portion of the other casing member, whereby either member of the casing may be detached without disturbing the other casing member, the hook plates or the protective caps.

In testimony whereof I affix my signature in presence of two witnesses.

WAYNE C. FICKES.

Witnesses:
A. M. GRUNKE,
RALPH FICKES.

Copies of this patent may be obtained for five cents each, by addressing the "Commissioner of Patents, Washington, D. C."